United States Patent [19]

Montz

[11] E Re. 28,716

[45] Reissued Feb. 17, 1976

[54] APPARATUS FOR DETECTING A GROUND CONNECTION ON LOAD SIDE OF NEUTRAL CONDUCTOR

[75] Inventor: James R. Montz, Two Rivers, Wis.

[73] Assignee: AMF Incorporated, White Plains, N.Y.

[22] Filed: Mar. 21, 1975

[21] Appl. No.: 560,852

Related U.S. Patent Documents

Reissue of:

[64] Patent No.: 3,800,189
Issued: Mar. 26, 1974
Appl. No.: 310,184
Filed: Nov. 28, 1972

[52] U.S. Cl. ..... 317/18 D; 317/27 R; 317/53

[51] Int. Cl.[2] ..... H02H 3/16; H02H 3/28

[58] Field of Search ..... 317/18 R, 18 D, 27 R, 53, 317/33 R, 33 SC, 141 R, 141 S; 331/117

[56] References Cited

UNITED STATES PATENTS

| | | | |
|---|---|---|---|
| 3,213,321 | 10/1965 | Dalziel | 317/18 D |
| 3,345,539 | 10/1967 | Ashenden et al. | 317/33 SC |
| 3,381,533 | 5/1968 | Behrens | 331/117 |
| 3,475,698 | 10/1969 | Noe | 331/117 |
| 3,611,035 | 10/1971 | Douglas | 317/18 D |
| 3,638,072 | 1/1972 | Kobayashi | 317/18 D |
| 3,668,469 | 6/1972 | Lee | 317/18 D |
| 3,713,003 | 1/1973 | Benham | 317/18 D |
| R25,762 | 4/1965 | Kotheimer | 317/36 TD |

*Primary Examiner*—J. D. Miller
*Assistant Examiner*—Patrick R. Salce
*Attorney, Agent, or Firm*—George W. Price; John H. Gallagher

[57] ABSTRACT

An improper or undesired second ground connection on the load side of the neutral conductor of an electrical supply system is detected by coupling an oscillator to the neutral conductor and to at least one other conductor of the supply system in a balanced mode. In the absence of said improper or undesired second ground, oscillator signals cancel on the two conductors. When said second ground is present, oscillator current flows therethrough and the impedance change in the grounded neutral conductor is reflected back to the oscillator tank circuit to change the output signal of the oscillator. Change in output signal is detected and actuates circuit breaker to disconnect the supply system.

23 Claims, 1 Drawing Figure

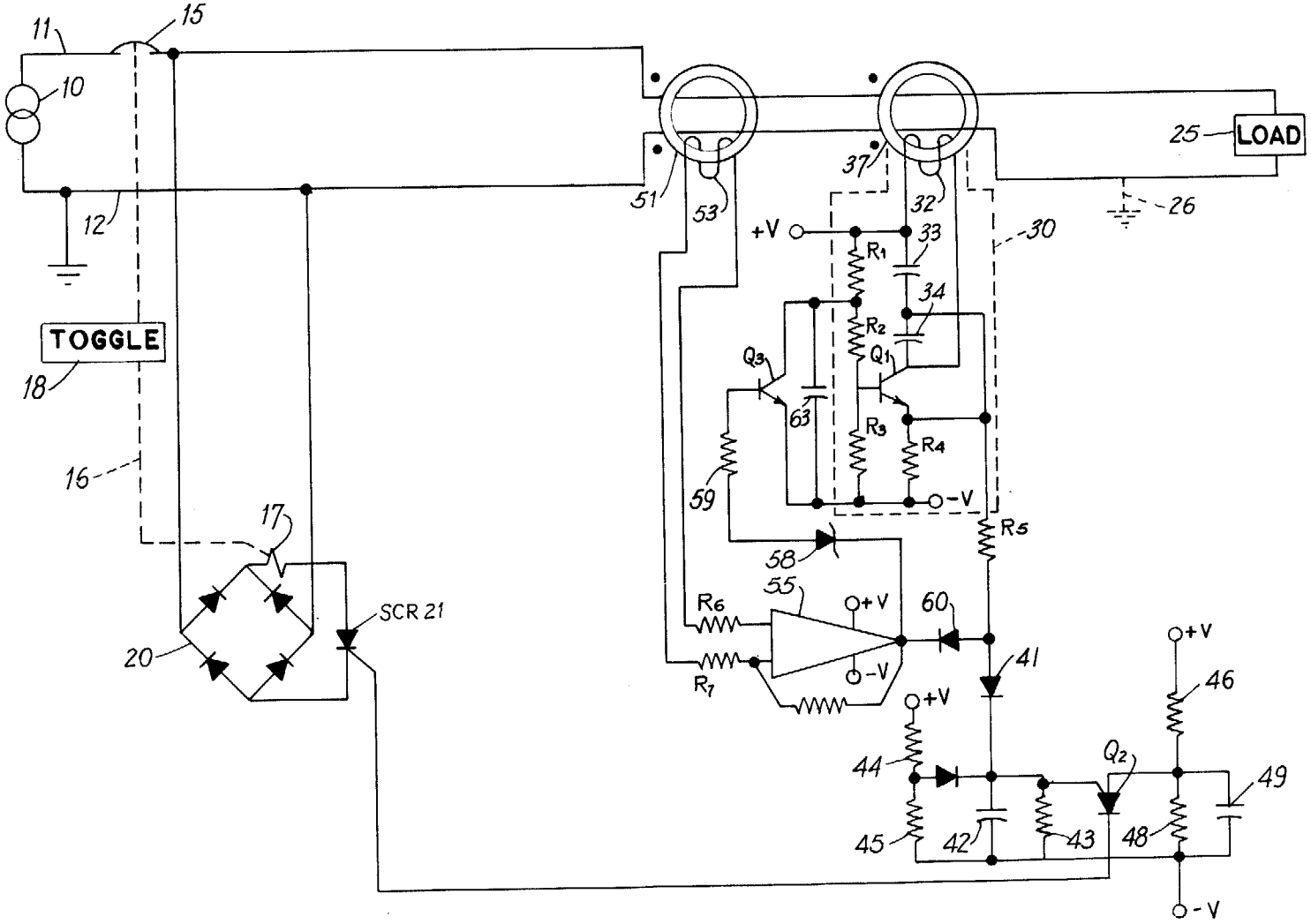
LOAD
TOGGLE
SCR 21
+V
-V
R1
R2
R3
R4
R5
R6
R7
Q1
Q2
Q3
10
11
12
15
16
17
18
20
25
26
30
32
33
34
37
41
42
43
44
45
46
48
49
51
53
55
58
59
60
63

APPARATUS FOR DETECTING A GROUND CONNECTION ON LOAD SIDE OF NEUTRAL CONDUCTOR

Matter enclosed in heavy brackets [ ] appears in the original patent but forms no part of this reissue specification; matter printed in italics indicates the additions made by reissue.

BACKGROUND OF THE INVENTION

In recent years many proposals have been offered to protect humans and property which inadvertently come into contact with a current conducting line of an electrical supply system, or which unexpectedly are subject to high voltage and thus shock and damage because of some fault occurring in the supply system. Devices known as Ground Fault Current Interrupters (GFCI) are known for use in electrical supply systems as means for attempting to provide the desired safety to humans, machinery and other property. Many of these devices employ a differential transformer whose primary windings are the current carrying lines of the supply system and whose secondary winding is connected to fault detection circuitry. In the absence of a fault or hazard on the lines of the system the current flowing toward the load is equal to the current returning back to the source. The equal currents in the primary windings of the transformer induce equal and opposing magnetic flux fields in the transformer core and no signal is coupled to the secondary winding. When a fault occurs in the system, such as a human becoming inadvertently connected from a current carrying line to ground, currents in the primary windings of the transformer no longer are equal and a resultant flux is established in the transformer core. This flux induces a signal in the secondary winding which initiates operation of a circuit breaker to open the lines of the system.

Ground Fault Current Interrupters of the type described above are effective to provide protection against many but not all types of faults that may occur. One type of fault that may not be detected by the described type of GFCI is one in which the neutral line of the supply system is intentionally or inadvertently grounded on the load side of the GFCI. The intentional grounding may occur because an electrician, appliance installer, or home owner violated an electrical code, most of which prohibit such a ground connection. In this situation, if grounded human comes into contact with the "hot" line of the supply system on the load side of the GFCI, current will flow through his body to ground. However, this current will not necessarily flow exclusively through ground to the ground connection on the neutral line that is at the source of current, it being assumed that the neutral conductor always is grounded at the source as is standard practice. It may happen that a portion of the current that flows through the human to ground will flow to the second improper or inadvertent ground on the load side and return to the source through the neutral conductor which is one primary winding of the GFCI transformer. In this situation the unbalance of currents in the primary windings of the GFCI may not be of sufficient magnitude to activate the fault detection circuitry of the GFCI. Consequently, the human may suffer injurious or fatal shock.

SUMMARY OF THE INVENTION

The present invention is a circuit for detecting when the neutral line of an electrical supply system is grounded on the road side of a conventional type GFCI. According to this invention, a high frequency oscillator is coupled to both lines, or conductors, of a two line supply system, for example, in a balanced mode. The coupling is accomplished by winding the coil of the tank circuit of the oscillator as the primary winding on a transformer core, and the two lines of the supply system are coupled to the core as secondary windings. Because the oscillator signal is coupled to the two secondary windings in a balanced mode, i.e., the oscillator signal is in bucking or series opposed relationship on the two line conductors, no oscillator signal will be present on the two lines in the absence of a fault on the load side of the core and in the absence of an improper or inadvertent ground on the neutral line on the load side of the core. If, however, the neutral conductor is improperly grounded on the load side, oscillator current will flow through the neutral conductor to the improper ground connection. This condition represents an impedance change in the coupled secondary circuit of the transformer and this impedance change is reflected back to the primary circuit of the transformer to change the effective impedance of the tank circuit of the oscillator. The oscillator is so constructed and arranged that the change in effective impedance of the tank circuit produces a significant change in the magnitude of the oscillator output signal. A detection circuit which is directly coupled to the oscillator is activated by the change in oscillator output signal and actuates a circuit breaker to disconnect the lines from the source of supply. Thus, even though no actual fault may exist and the system might otherwise be operable because a conventional GFCI device would not be tripped, the circuit of the present invention will trip a circuit breaker.

BRIEF DESCRIPTION OF THE DRAWING

The accompanying drawing is a circuit diagram illustrating the grounded neutral detector circuit of this invention, and further showing it in cooperative relationship with a ground fault current interrupter that detects more conventional types of faults.

DESCRIPTION OF PREFERRED EMBODIMENT

The present invention will be described in connection with a two wire single phase electrical supply system. It is to be understood that this is but one example of a supply system in which the invention may be used, and that other types of systems may be protected by the circuit of this invention.

A source 10 is connected to lines, or conductors, 11 and 12 and supplies current at 120 volts and 60 Hertz, for example, to the lines. Source 10 is grounded as illustrated so that line 11 is the "hot" line and line 12 is the ground or neutral line. Circuit breaker contact means 15 is interposed in line 11 and is connected to a linkage 16 that is actuated by a solenoid 17. The entire circuit breaker assembly is of known type which is manually settable to the closed condition illustrated, and which operates in response to energization of solenoid 17 to open contact means 15 to disconnect source 10 from lines 11 and 12. Desirably, the circuit breaker is the commonly employed type that has an over-the-center toggle reset mechanism 18 which cannot close the circuit breaker contacts so long as solenoid 17 remains energized. Solenoid 17 is connected to the output of a bridge rectifier circuit 20 whose input is connected across lines 11 and 12. Under normal and proper conditions, solenoid 17 is not sufficiently energized to actuate the circuit breaker because its conduction path with bridge rectifier 20 includes the SCR switching device 21 which normally in nonconducting.

The supply system load 25 is connected at the right ends of lines 11 and 12. Electrical wiring codes do not permit neutral conductor 12 to be grounded at the load side thereof. However, as previously mentioned, the neutral conductor 12 may be intentionally or inadvertently grounded on the load side, as illustrated by the broken line ground symbol 26.

The potentially hazardous second ground 26 on neutral conductor 12 is detected by circuitry of this invention which includes an oscillator circuit 30 which is illustrated to be of the Colpitts type. The oscillator is comprised of transistor $Q_1$ and a tank circuit including winding 32 and capacitors 33 and 34 connected between the collector and the power supply of transistor $Q_1$. The emitter electrode of transistor $Q_1$ is connected to the junction between capacitors 33 and 34. Resistors $R_1$–$R_4$ are biasing resistors. Winding 32, which is the inductive element of the tank circuit of oscillator 30, is wound as the primary winding on a transformer toroidal core 37 and lines 11 and 12 thread through core 37 and are in relatively tight magnetic coupling relationship therewith to comprise secondary windings on the transformer core 37. The windings are arranged on core 37 so that primary winding 32 excites the secondary lines 11 and 12 in a balanced mode. That is, oscillator signal voltages are induced onto secondary lines 11 and 12 in bucking or series opposed relationship. Therefore, in the absence of a second ground connection 26 on neutral conductor 12, no oscillator signal will in fact be present on lines 11 and 12 because of the balanced mode coupling. Although the frequency of oscillation of oscillator 30 is not critical, in a successfully operating circuit I have employed an oscillator frequency of 20 kilo Hertz.

With the conditions existing as just described, i.e., neutral conductor 12 is not grounded on the load side of core 37, oscillator 30 will oscillate at a given frequency and with a given magnitude of output signal. The oscillator signal is coupled through isolating resistor $R_5$ and charges a peak detector comprised of diode 41, capacitor 42, and resistor 43. Capacitor 42 and resistor 43 comprise a relatively long time constant circuit coupled to the gate electrode of unijunction transistor $Q_2$. The d.c. bias on the gate electrode of unijunction transistor $Q_2$ is provided by the peak detector, and a minimum value of bias voltage is provided by a voltage divider formed by resistors 44 and 45 connected between the positive and negative d.c. voltage sources. The anode electrode of unijunction transistor $Q_2$ is coupled to a voltage divider formed by resistors 46 and 48 which are coupled across the d.c. voltage source. Resistor 48 and capacitor 49 comprise a time constant circuit which will be discussed below. The parameter values of circuit elements associated with unijunction transistor $Q_2$ are chosen so that it normally is nonconducting when oscillator 30 is producing its normal output signal of a first magnitude in the absence of ground connection 26 on neutral conductor 12.

The cathode electrode of unijunction transistor $Q_2$ is connected to the gate electrode of SCR 21 which is non-conducting when unijunction transistor $Q_2$ is non-conducting. As previously discussed, solenoid 17 will not actuate the circuit breaker linkage 16 to open line 11 under these conditions.

Considering now the characteristics and operation of the oscillator circuit of this invention when a second ground connection 26 occurs on the load side of transformer core 37, the impedances of the secondary lines 11 and 12 no longer are equal and oscillator current now will flow in line 12 to ground through ground connection 26. This current flow in the secondary circuit on core 37 changes the magnetic flux flowing in the core, thus changing the loading on the tank circuit of oscillator 30. Another way of looking at the situation is the following. Ground connection 26 which is to be detected is a low impedance in the secondary circuit of the transformer formed by core 37, and this low impedance is reflected back to the primary of the transformer in parallel with the tank circuit formed by winding 32 and capacitors 33 and 34. The parameter values of winding 32 and capacitors 33 and 34 are chosen so that at the 20 kilo Hertz frequency of oscillation the tank circuit normally represents a high impedance. However, the low secondary impedance reflected back in parallel with the primary of the tank circuit results in an effective tank circuit impedance that is appreciably lower in magnitude than its normal impedance in the absence of ground connection 26. Oscillator 30 is so constructed and arranged that tank circuit impedance is the dominant portion of the oscillator circuit in determining the magnitude of the oscillator output signal. That is, the amplitude of the oscillator output signal is a direct function of the impedance of the tank circuit portion of the oscillator circuit. It therefore may be said that the magnitude of the output signal of oscillator 30 is tank circuit dependent. Consequently, when the impedance of grounded neutral line 12 reflects back into the tank circuit to appreciably reduce the effective tank circuit impedance, the magnitude of the oscillator output signal decreases correspondingly to a second value. The change in magnitude of the oscillator signal is chosen to be sufficiently great so as to be readily detectable by relatively simple circuitry. This change in magnitude of the output signal of oscillator 30 desirably is accomplished without any significant change in the frequency of oscillation.

In a satisfactorily operating embodiment of the invention, the tank circuit had a normal impedance of approximately 3,100 ohms in the absence of a ground connection 26, and a 4 ohm impedance of grounded neutral line 12 reflected back into the primary circuit as an impedance of approximately 1,600 ohms. This arrangement provided an easily detectable change in the oscillator signal and afforded reliable operation. It is to be understood that this is but one specific example and that other parameter values and other circuit configurations may be utilized to detect a change in the magnitude of the oscillator signal.

In achieving the desired operating characteristics of oscillator 30, a design goal should be that the tank circuit impedance in the absence of ground connection 26 should be equal to or greater than the impedance of the remaining portion of the oscillator circuit and load when looking externally of the tank circuit at the feedback point at the emitter electrode of transistor $Q_2$. Another way of expressing the same relationship is that at the collector electrode of transistor $Q_2$, the normal impedance to ground of the tank circuit should be equal to or greater than the impedance of the remaining portion of the oscillator and the load taken at the feedback point.

In considering the tank circuit of oscillator 30, the characteristics of transformer core 37 also must be considered. A suitable toroidal core that has been used was made from a ferrite material that had a relatively high permeability in the range of 3,000 and a Q value in excess of 30 at 20 kilohertz. The core had an outer diameter of 0.5 inch, an inner diameter of 0.283 inch, a thickness of 0.350 inch and is obtainable from Arnold Engineering Company, Marengo, Illinois as catalog number AK-30-D05012.

Specific components and to be parameter values for circuit elements which have been found to satisfactory for oscillator 30 are listed below:

Transistor $Q_1$ — 2N930
Resistors $R_1$ and $R_3$ — 33 kilohms
Resistor $R_2$ — 22 kilohms
Resistor $R_4$ — 1.8 kilohms
Capacitors 33 and 34 — 0.15 microfarads
Winding 32 — 1 millihenry (20 turns — No. 30 wire)

Continuing with the discussion of the circuit operation in the presence of ground connection 26 on neutral conductor 12, the oscillator output signal of decreased magnitude is coupled through isolating resistor $R_5$ to the peak detector circuit formed by diode 41 and capacitor 42. The voltage level at the output of the peak detector circuit will drop to a correspondingly reduced magnitude, thereby lowering the bias voltage on the gate electrode of unijunction transistor $Q_2$. The parameter values of the circuit elements associated with unijunction transistor $Q_2$ are chosen so that its gate electrode voltage now is below its anode electrode voltage and unijunction transistor $Q_2$ conducts repetitively, as will be explained in more detail below. The gate electrode of SCR 21 is connected through conducting unijunction transistor $Q_2$ to the time constant circuit comprised of resistor 46 and parallel connected resistor 48 and capacitor 49. With a positive potential applied to its gate electrode, SCR 21 is biased into conduction, thereby completing the current path in the output circuit of bridge rectifier 20 and energizing solenoid 17. Energization of solenoid 17 actuates mechanical linkage 16 and trips circuit breaker contacts 15 to open line 11.

Unijunction transistor $Q_2$ in combination with resistor 46 and parallel connected resistor 48 and capacitor 49 connected to its anode electrode comprise a relaxation oscillator which produces repetitive pulsing or conduction of unijunction transistor $Q_2$. The connection of the gate electrode of unijunction transistor $Q_2$ to the voltage divider formed by resistors 44 and 45 assures that a minimum operative bias voltage will be maintained on the gate electrode of $Q_2$ when the output signal of oscillator 30 is at its second, or lower, magnitude. This feature of providing a relaxation oscillator for repetitively triggering SCR 21 assures that the SCR will conduct when the output signal of oscillator 30 is at its second magnitude. If, for example, only a single pulse from unijunction transistor $Q_2$ were coupled to the gate electrode of SCR 21, the 60 Hertz source voltage might be at or near zero voltage at that particular instant and the anode voltage of SCR 21 might not be sufficiently high to allow it to conduct. The repetitive triggering of SCR 21 assures that SCR 21 will be rendered conductive. Of course, the pulse repetition frequence of the relaxation oscillator that includes unijunction transistor $Q_2$ should be a large multiple of the frequency of source 10 so that SCR 21 will be triggered into conduction without any significant time delay. The circuit operation just described will be the same if a d.c. voltage source is connected to lines 11 and 12 instead of an a.c. source 10. This is true because the grounded neutral detection circuit operates only in response to the oscillator signal and not in response to the voltage or current on lines 11 and 12 supplied by the system source 10. In fact, it is desirable that the tank circuit of oscillator 30 be effectively isolated from and not "see" the 60 Hertz current and voltage on lines 11 and 12. The reason for this is that for most reliable operation of the grounded neutral detector circuit of this invention the operation of oscillator 30 should not be influenced or affected by any change that may occur in system load 25. As one practical example, the desired isolation of oscillator 30 from the 60 Hertz current on lines 11 and 12 may be achieved by the use of a material for transformer core 37 which exhibits a very low magnetic permeability and is substantially nonmagnetic at the 60 Hertz frequency, but which exhibits a high magnetic permeability and possesses significant magnetic properties at the higher frequencies of oscillator 30. The specific ferrite material mentioned above for core 37 possesses the desired properties. Other suitable materials are commercially available.

The grounded neutral detector circuit described above is an independently operating circuit which is separate and distinct from a more conventional Ground Fault Current Interrupter (GFCI) circuit, but it may be packaged with and share some portions of its circuitry with a GFCI circuit. As an example, in the attached drawing, a second toroidal core 51 is the core of a conventional differential transformer of the type well known in the art for detecting differential 60 Hertz current flow in lines 11 and 12 which comprise primary windings threaded through the core. The material from which core 51 is made is different from the material from which core 37 is made. Core 51 exhibits a high permeability and significant magnetic properties at the 60 Hertz frequency of source 10 but not at the higher 20 kilohertz frequency of oscillator 30.

A multiturn secondary winding 53 is wound on core 51 and its two leads are coupled through resistors $R_6$ and $R_7$ to an operational amplifier 55.

The operation of the portion of the GFCL circuit thus far described is well understood by those skilled in the art and will not be explained except to note that in the absence of an unbalance of 60 Hertz current flow in lines 11 and 12, amplifier 55 will produce no output signal. When an unbalance of 60 Hertz current flow does occur in lines 11 and 12 amplifier 55 produces a corresponding 60 Hertz output signal.

On each positive half cycle of the output signal from amplifier 55, Zener diode 58 breaks down and the signal is coupled through current limiting resistor 59 to the base electrode of normally nonconducting transistor $Q_3$ to cause that transistor to conduct. The conduction of transistor $Q_3$ effectively shunts the d.c. biasing network for the base electrode of transistor $Q_3$ and causes oscillator 30 to abruptly cease oscillation. This then causes the voltage level to fall in the peak detector formed by diode 41 and capacitor 42, thereby activating the relaxation oscillator that includes unijunction transistor $Q_2$ in the same manner as described above in the description of the operation of the grounded neutral detector circuit. SCR 21 then will be rendered conductive and solenoid 17 will be energized to cause circuit breaker contacts 15 to be opened.

On each negative half cycle of the 60 Hertz output signal from amplifier 55, diode 60 will conduct and will couple the negative signal to the anode of diode 41, thereby placing diode 41 in a blocking condition with respect to the output signal from the now oscillating oscillator 30. Capacitor 42 of the peak detector discharges through resistor 43 and the relaxation oscillator that includes unijunctions transistor $Q_2$ is actuated and SCR 21 is rendered conducting. As previously explained, circuit breaker contacts 15 are opened when SCR 21 conducts.

Capacitor 63 which is connected in shunt with resistors $R_2$ and $R_3$ in the base electrode bias circuit of oscillator transistor $Q_1$ is a filter capacitor for the 20 kilohertz oscillator signal to assure that no unwanted oscillator signal which might incidentally get coupled to and through amplifier 55 will coupled to the base electrode to undesirably affect the operation of oscillator 30.

To avoid unintentional triggering of unijunction transistor $Q_2$ from transients, as might occur when the d.c. power supply is turned on, the time constant circuit comprised of parallel connected resistor 48 and capacitor 49 serves as a smoother circuit to minimize transients on the anode electrode of the unijunction transistor. The time constant circuit comprised of parallel connected capacitor 42 and resistor 43 serve a similar function in the gate electrode circuit of $Q_2$ to prevent triggering thereof except in response to a change in output signal level of oscillator 30 which results from a fault.

The operation of oscillator 30 and its associated circuitry has been discussed in relation to an undesired second ground connection on neutral conductor 12 since this is a potentially hazardous condition to be guarded against. It will be understood that the operation of oscillator 30 will be similar to that described above in the presence of a ground on the "hot" conductor 11 since the secondary circuit on transformer core 37 will not represent a balanced circuit to the oscillator signal in that situation.

The grounded neutral detector circuit of this invention is compact and easily packaged in a small housing or case. This results in part from the choice of a relatively high frequency of operation of oscillator 30. Further, the circuit of this invention is reliable in operation and does not adversely affect the 60 Hertz supply system, nor is it adversely affected thereby. That is, because of the balanced coupling of the oscillator to the supply system lines, no oscillator signal will couple to loads of a properly operating system and loads cannot be adversely affected by the oscillator signal. Conversely, due to the balanced coupling arrangement, changes in the supply system load and extraneous signals or noise on the supply system line which are in the frequency range of the oscillator will not couple back to the oscillator when the supply system is functioning properly. Consequently, the circuit performs as described independently of loading conditions.

While the above discussion describes a preferred circuit embodiment of the present invention, it is to be understood that this is but an example of means for carrying out the invention and that other circuit embodiments may be used in the practice of the invention.

What is claimed is:

1. A fault protection circuit for use in an electrical supply system at a location therein between a current source and an electrical load, wherein said supply system has a plurality of conductors including a neutral conductor that is electrically grounded on the source side of said protection circuit, said protection circuit being operable to detect an undesired second electrical ground that is present on one of the conductors on the load side of said protection circuit, said circuit comprising an oscillator circuit for providing an oscillator signal at a frequency different from the frequency of the supply system current, said oscillator circuit having a portion thereof whose impedance is dominant in determining a characteristic of the output signal of said oscillator, means coupling said oscillator circuit to conductors of said supply system for coupling said oscillator signal to the coupled conductors in a balanced mode so that substantially no oscillator current flows in the conductors in the absence of an undesired second ground connection on the load side of one of the conductors and for reflecting back to the oscillator circuit the impedance to ground of at least one of the conductors when said undesired second ground connection is present thereon, the normal impedance of said dominant portion of the oscillator circuit in the absence of the second ground connection being proportioned relative to said impedance reflected back to the oscillator circuit when said second ground connection is present to cause an appreciable difference in the equivalent impedance of said dominant portion of the oscillator circuit, thereby to cause a detectable difference in said characteristic of the output signal of the oscillator, said means for coupling the oscillator circuit to the conductors being substantially non-responsive to supply system current, and means coupled to the oscillator circuit for detecting the difference in said characteristic of the oscillator output signal and for providing a fault signal in response thereto, said last named means being coupled to the oscillator circuit by means other than the supply system conductors or the means that couples the oscillator circuit to the conductors.

2. The combination claimed in claim 1 wherein the means coupling said oscillator circuit to said supply system conductors includes a transformer core made of a material that exhibits substantial magnetic properties to said oscillator signal but is substantially nonmagnetic to said supply system current.

3. The fault protection circuit claimed in claim 1 and further including, current interrupter means operable in response to said fault signal for interrupting the flow of supply system current on the supply system conductors.

4. The faul protection circuit claimed in claim 3 and further including ground fault sensing means coupled to said neutral conductor and to at least one other conductor of the electrical supply system for detecting an undesired unbalance of supply system current flow in said conductors and operating in response thereto to produce a ground fault signal, and means operable in response to said ground fault signal for operating said supply current interrupter means.

5. The combination claimed in claim 4 wherein said ground fault sensing means includes a second transformer core made of a material that exhibits substantial magnetic properties to the supply system current but exhibits substantially nonmagnetic properties to the oscillator signal.

6. An electrical fault protection circuit for use in an electrical supply system at a location therein between a system current source and an electrical load, wherein said supply system has a neutral conductor that is electrically grounded on the source side of said protection circuit, said protection circuit being operable to detect an undesired second electrical ground connection that is present on one of the conductors on the load side of said protection circuit, said circuit comprising an oscillator for providing an output signal at a frequency different from the frequency of the current from said source, said oscillator including a tank circuit and having its circuit elements proportioned and arranged so that the impedance of the tank circuit is dominant in determining the magnitude of the oscillator output signal, a transformer core effective to couple said oscillator output signal but ineffective to couple signals at the frequency of the supply system, a primary winding on said core for coupling the tank circuit to the core, said neutral conductor and at least said one conductor of the supply system being magnetically coupled to said core as secondary windings in a manner to be excited in a balanced mode by the oscillator signal on said primary winding and in a manner to reflect back to the tank circuit the impedance to ground of one of said conductors when said undesired second ground connection is present thereon, thereby to cause the effective impedance of the tank circuit to have first and second values and the oscillator signal to have first and second magnitudes, respectively, when the second ground connection is absent and present, fault signal producing means coupled to said oscillator by means other than said core or the conductors of said supply system for producing a fault signal when the oscillator signal is at said second magnitude.

7. A ground fault protection circuit for use in an electrical supply system at a location therein between a system current source and an electrical load, wherein said supply system has a neutral conductor that is electrically grounded on the source side of said protection circuit, said protection circuit being operable to detect an improper or undesired second electrical ground connection that is present on one of the conductors on the load side of said protection circuit, said circuit comprising an oscillator for providing an oscillator signal at a frequency different from the frequency of the current from said source, said oscillator including a tank circuit and having its circuit elements proportioned and arranged so that the impedance of the tank circuit is dominant in determining the magnitude of the oscillator signal, a transformer core effective to couple said oscillator signal but ineffective to couple signals at the frequency of the supply system, a primary winding on said core for coupling the tank circuit thereto, said neutral conductor and at least said one conductor of the supply system being magnetically coupled to said core as secondary windings in a manner to be excited in a balanced mode by the oscillator signal on said primary winding, the impedance of the tank circuit in the absence of said second ground connection being greater in magnitude than the reflected impedance to ground of a conductor having a second ground connection thereon which is to be detected, whereby the magnitude of the oscillator signal changes by a detectable amount when said second ground connection is absent and when it is present, and means coupled to said oscillator circuit by means other than said core or supply system conductors for detecting a change of given magnitude of said oscillator signal.

8. A fault protection circuit for use in an electrical supply system at a location therein between a current source and an electrical load, wherein said supply system has a plurality of conductors including a neutral conductor that is electrically grounded on the source side of said protection circuit, said protection circuit being operable to detect an undesired second electrical ground that is present on one of the conductors on the load side of said protection circuit, said circuit comprising an oscillator circuit for providing an oscillator signal that is different in frequency from said supply system current, said oscillator circuit having a portion thereof whose impedance is dominant in determining a characteristic of the output signal of said oscillator, means coupling said oscillator circuit to conductors of said supply system for coupling said oscillator signal to the coupled conductors in a balanced mode so that substantially no oscillator current flows in the conductors in the absence of an undesired second ground connection on the load side of one of the conductors and for reflecting back to said dominant portion of the oscillator circuit the impedance to ground of said one conductor when the second ground connection is present thereon, thereby to cause a detectable difference in said characteristic of the output signal of the oscillator when the second ground connection is present, first fault signal producing means coupled to said oscillator circuit by means excluding said conductors of the supply system and excluding the means for coupling the oscillator circuit to said conductors for producing a first fault signal when the oscillator signal has the characteristic associated with said second ground connection being present, ground fault protection means for detecting an undesired unbalance of supply system current flow in said conductors of the supply system, said ground fault detector means being substantially nonresponsive to an unbalance of oscillator signal currents on the conductors of the supply system, and the means coupling the oscillator signal to conductors of the supply system being substantially nonresponsive to an unbalance of supply system current in said conductors, means operable in response to said first fault signal and operable in response to a detected unbalance of supply system current flow by the ground fault detector means for interrupting supply system current flow on the supply system conductors.

9. The combination claimed in claim 1 wherein said characteristic of the oscillator output signal which changes by a detectable difference is the magnitude of said output signal.

10. The combination claimed in claim 9 wherein said oscillator circuit is constructed and arranged so that the frequency of its output signal remains substantially fixed when the magnitude of the output signal changes.

*11. The fault protection circuit claimed in claim 1 wherein the magnitude of the oscillator signal changes upon the occurrence of said undesired second ground connection and wherein said means for providing a fault signal includes*

*a semiconductor device having at least first and second electrodes and operable between conducting and nonconducting states,*

*means for establishing a voltage bias of given magnitude on said first electrode of said device,*

*peak detector means coupled to the second electrode of said device,*

*means including first diode means for coupling said oscillator circuit to said peak detector means,*

*said first diode means being connected to prevent discharge therethrough of said peak detector means,*

*said peak detector having a given discharge time constant in a path other than through said first diode means,*

*the characteristics and parameters of said bias means, said peak detector means and said semiconductor device being so proportioned that the voltage on said second electrode in the absence of said undesired second ground connection maintains said device in one of its states, but transfers the device to its other state in the presence of an undesired ground on said neutral conductor.*

*12. The combination claimed in claim 11 and further including,*

*a time constant circuit coupled to said first electrode of the semiconductor device.*

*13. The combination claimed in claim 12 wherein said time constant circuit and said semiconductor device comprise a relaxation oscillator having a repetition frequency to assure repetitive transfer of states of the semiconductor device during the occurrence of a half cycle of the source current.*

*14. The combination claimed in claim 13 wherein said peak detector means is a time constant circuit having a charging time constant that is longer than the time constant circuit coupled to said first electrode.*

*15. The fault protection circuit claimed in claim 11 and including*

*ground fault protection means for detecting an undesired unbalance of supply system current flow in the conductors of the supply system,*

*a second diode having one terminal coupled to the output of said ground fault protection means and its other terminal connected to a junction between said oscillator circuit and said first diode,*

*like poles of said diodes being coupled to said junction,*

*said second diode operating in response to an output signal of said ground fault protection means to block conduction from said oscillator circuit to said peak detector means, whereby the magnitude of voltage in said detection circuit changes to transfer the semiconductor device to its other state.*

*16. The combination claimed in claim 8 wherein said means operable in response to said first fault signal and in response to a detected unbalance of supply system current comprises,*

*a time constant detection circuit for providing a d.c. voltage, said detection circuit having a given discharge rate in the absence of an input signal thereto,*

*means including a first diode for coupling said oscillator circuit to said detection circuit for maintaining a d.c. voltage of a first magnitude in said detection circuit in the absence of a fault in said system,*

*said first diode being connected to prevent discharge therethrough of said time constant detection circuit,*

*a second diode coupled between said ground fault protection means and a junction between said first diode and oscillator circuit,*

*said two diode means having like terminals connected to said junction, whereby conduction of said second diode diverts current from said first diode and detection circuit and the voltage in said time constant detection circuit will change to a second d.c. magnitude,*

*said second diode conducting in response to the ground fault protection means sensing an undesired unbalance of supply system current flow,*

*a semiconductor device having at least two terminals and operable between conducting and nonconducting states,*

*means for coupling the first terminal of the semiconductor device to said detection circuit,*

*means for coupling a voltage source to the second terminal of the semiconductor device, the magnitude of the voltage provided by said voltage source being proportioned relative to the characteristics and parameters of said device to maintain the device in one of its conduction states when the voltage in said detection circuit is at said first magnitude and to transfer said device to its other state when the voltage magnitude in said detection circuit is at said second magnitude.*

*17. The combination claimed in claim 16 wherein said time constant detection circuit is comprised of parallel connected resistor and capacitor having parameter values proportioned to smooth transient signals and prevent undesired triggering of the semiconductor device.*

*18. The combination claimed in claim 17 wherein said ground fault protection means includes an operational amplifier,*

*said second diode having one terminal connected to the output of said operational amplifier.*

*19. The combination claimed in claim 18 and further including*

*means coupled to the second terminal of the semiconductor device for causing repetitive changes of state of the semiconductor device when the voltage of the detection circuit changes to said second magnitude.*

*20. A fault protection circuit for use in an electrical supply system to disconnect one or more conductors of the system from the system source in the event of a fault in the system, said circuit comprising*

*fault sensing means coupled to the conductors between the system source and load for producing an electrical signal in response to a fault condition in the system,*

*a time constant detection circuit for providing a d.c. voltage, said detection circuit having a given discharge rate in the absence of an input signal thereto,*

*voltage means for maintaining a d.c. voltage of a first magnitude in said detection circuit in the absence of a fault in said system,*

*first diode means coupled between said voltage means and said detection circuit and connected to prevent discharge of the time constant detector circuit therethrough,*

*second diode means having one terminal coupled to said fault sensing means and its other terminal coupled between said voltage means and said first diode means,*

*said second diode means being rendered conductive by said electrical signal from the fault sensing means,*

*said second diode means being connected with a polarity to block current flow through said first diode means upon occurrence of said electrical signal from the fault sensing means, whereby the voltage magnitude in said time constant detection circuit will change to a second magnitude,*

*a semiconductor device having at least two terminals and operable between conducting and nonconducting states,*

*means for coupling the first terminal of the semiconductor device to said detection circuit,*

*means for coupling a voltage source to the second terminal of the semiconductor device, the magnitude of the voltage of said voltage source being proportioned with respect to the characteristics and parameters of the semiconductor device to maintain said device in one of its states when the voltage in said detection circuit is at said first magnitude and to transfer said device to its other state when the voltage magnitude in said detection circuit is at said second magnitude, and*

*means coupled to said semiconductor device for interrupting supply system current on said conductors in response to said semiconductor device transferring to said other state.*

*21. The combination claimed in claim 20 wherein said fault sensing means includes*

*an operational amplifier,*

*said second diode being coupled to the output of said operational amplifier and being rendered conductive by the operational amplifier upon the sensing of a fault.*

*22. The combination claimed in claim 21 wherein said first and second diodes are connected to conduct current to said detection circuit and to said operational amplifier, respectively.*

*23. The combination claimed in claim 20 and further including,*

*a second time constant circuit coupled to said second terminal of the semiconductor device,*

*said second time constant circuit and said semiconductor device comprising a relaxation oscillator to repetitively change the conduction state of the device upon occurrence of a fault.*

* * * * *